United States Patent [19]
Takata et al.

[11] Patent Number: 5,205,191
[45] Date of Patent: Apr. 27, 1993

[54] CONTROL SYSTEM FOR SUPERCHARGED ENGINE EQUIPPED WITH AUTOMATIC TRANSMISSION

[75] Inventors: Minoru Takata, Hiroshima; Hiroaki Yokota, Fuji; Hiroyuki Morioka, Hiroshima; Osamu Yamashita, Higashihiroshima, all of Japan

[73] Assignee: Mazda Motor Corporation, Hiroshima, Japan

[21] Appl. No.: 671,411

[22] Filed: Mar. 20, 1991

[30] Foreign Application Priority Data

Mar. 20, 1990 [JP] Japan .................................. 2-68221

[51] Int. Cl.$^5$ ............................................. F16H 59/32
[52] U.S. Cl. ..................................... 74/860; 60/602
[58] Field of Search ........................ 74/857, 858, 860; 60/600, 601, 602, 603; 123/559.1, 559.3, 560, 561, 562, 564

[56] References Cited

U.S. PATENT DOCUMENTS

| | | | |
|---|---|---|---|
| 4,926,636 | 5/1990 | Tadokoro et al. | 60/602 X |
| 4,926,640 | 5/1990 | Kazuo et al. | 60/602 |
| 4,964,318 | 10/1990 | Ganoung | 74/860 X |
| 5,050,452 | 9/1991 | Morioka | 60/602 X |

Primary Examiner—Dirk Wright
Attorney, Agent, or Firm—Keck, Mahin & Cate

[57] ABSTRACT

A control system for supercharging an internal combustion engine equipped with an automatic transmission includes superchargers which provide a variable capacity controlled by a supercharging capacity controller according to a supercharging capacity control pattern. The supercharging capacity is controlled so as increase at engine speeds higher when a demand to shift the automatic transmission to a lower speed gear is present than when a demand to shift the automatic transmission to a higher speed gear is present. Change of supercharging capacity is suspended for a predetermined period of time when a demand to shift the automatic transmission is present.

8 Claims, 4 Drawing Sheets

CONTROL SYSTEM FOR SUPERCHARGED ENGINE EQUIPPED WITH AUTOMATIC TRANSMISSION

BACKGROUND OF THE INVENTION

1. Field of the Invention

This invention pertains to a control system for a supercharged engine equipped with an automatic transmission and, more particularly, to a control system for controlling at least a primary supercharger which supercharges the engine in a low air intake rate region of operation and a secondary supercharger which supercharges the engine in a high air intake rate region of operation, as well as an automatic transmission.

2. Description of Related Art

Conventionally, some internal combustion engines for vehicles have at least a primary supercharger which supercharges the engine in a low air intake rate region of operation and a secondary supercharger which supercharges the engine in a high air intake rate region of operation. In such an internal combustion engine, these primary and secondary superchargers are selectively activated and sequentially controlled in accordance with previously provided, particularly designed switching patterns for various intake conditions of the internal combustion engine. Moreover, it is typical in such a control system to correct or change the switching patterns in accordance with the selected gears of the transmission in order to maintain a high supercharging condition.

In such a supercharged engine, which is equipped with an automatic transmission, as well as with first and second, or primary and secondary, superchargers, torque shock is produced upon switching the primary and secondary superchargers. Although such torque shock can be suppressed by precisely controlling the switching of the primary and secondary superchargers, it can not be avoided completely. Also, an automatic transmission is typically controlled so as to select a desired gear position in accordance with previously provided, particularly designed gear shift patterns for particular vehicle running conditions, or vehicle speeds, and engine operating conditions. Although gear shifting is precisely managed in order for the automatic transmission to eliminate gear shift shocks, since the operating condition of the engine changes during gear shifting, unnecessary switching of the primary and secondary superchargers may possibly occur in accordance with the switching patterns. In such a case, because the switching pattern is corrected according to gear shift positions, and the speed of the engine is increasingly or decreasingly changed during gear shifting, irregular switching of the primary and secondary superchargers is caused several times in a short period of time. For this reason, there is a chance that torque shock accompanying switching of the superchargers will be produced.

SUMMARY OF THE INVENTION

The present invention has the primary object of providing an improved control system for an internal combustion engine, having capacity changeable supercharging means and equipped with an automatic transmission, by which changing of the supercharging capacity of the supercharging means and shifting of the automatic transmission are less likely to occur simultaneously. Torque shock, which accompanies both changing of the supercharging capacity and shifting of the automatic transmission, is therefore reduced.

The object of the present invention is accomplished by providing a control system for an internal combustion engine equipped with an automatic transmission having supercharging means of variable supercharging capacity. The supercharging capacity of the supercharging means is changed, according to a previously established supercharging capacity control pattern, by supercharging control means. Specifically, the supercharging capacity is changed so as to increase at engine speeds which are higher when a shift of the automatic transmission to a lower speed gear is demanded than when a shift of the automatic transmission to a higher speed gear is demanded. Changing of the supercharging capacity of the supercharging means is, however, delayed for a period of time when a shift of the automatic transmission to a desired speed gear is demanded.

The supercharging control means specifically comprises two superchargers, such as turbochargers. One of the superchargers is activated at all engine speeds, and the other is selectively used, depending on engine speeds, so as to change the supercharging capacity stepwise, and more particularly, in two steps.

BRIEF DESCRIPTION OF THE DRAWINGS

The above and other objects and features of the present invention will be apparent from the following description of a preferred embodiment thereof when considered in conjunction with the appended drawings, in which.

DETAILED DESCRIPTION OF THE PREFERRED EMBODIMENT

Figure 1:
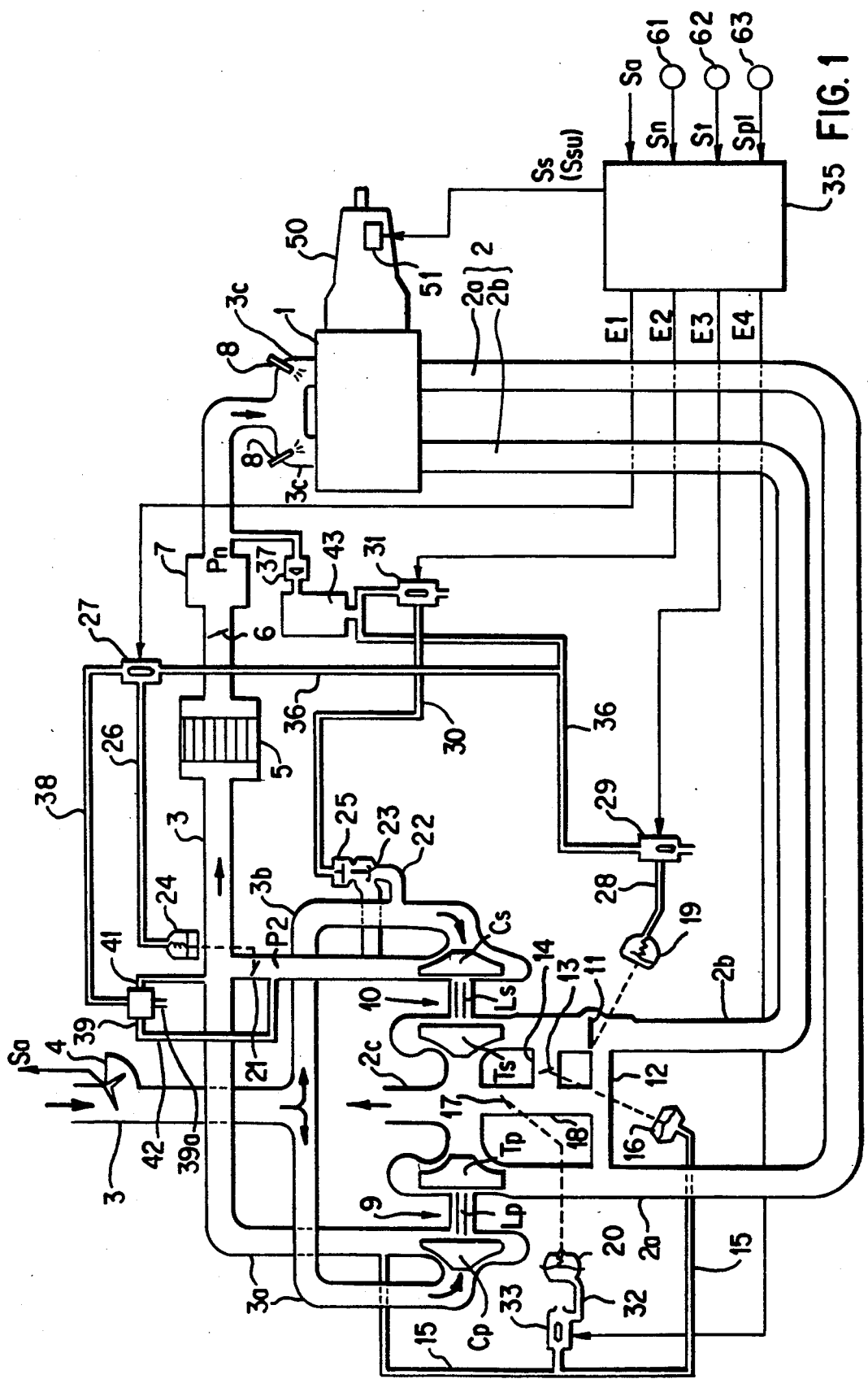
FIG. 1 is a schematic diagrammatical view of an engine control system for an engine equipped with superchargers and an automatic transmission according to a preferred embodiment of the present invention.

Referring now to the drawings in detail, and in particular, to FIG. 1, an internal combustion engine 1, such as a rotary engine or a reciprocating engine, equipped with an automatic transmission 50 which is controlled by an engine control system in accordance with a preferred embodiment of the present invention, is shown. The internal combustion engine 1 is further equipped with two superchargers, namely, a primary supercharger 9, which supercharges at least in a low intake air rate range or region, and a secondary supercharger 10, which supercharges in a high intake air rate range or region. Both of the superchargers are installed between intake and exhaust systems of the engine. Each supercharger 9 or 10 is a kind of turbocharger which is driven by exhaust gases from the engine, and may be of any known type. The automatic transmission 50, connected to an output axle or shaft of the engine 1, is automatically placed in a desired speed condition selected from a plurality of speed ranges and speed gears.

Engine 1 is provided with exhaust passage 2, comprising first and second exhaust pipes 2a and 2b, for discharging exhaust gases from the engine 1. The engine 1 is further provided with an intake passage, such as an intake pipe 3, for introducing intake air into the engine 1. The intake pipe 3 is provided with, from the upstream side thereof, an air flow meter 4, rotary blowers Cp and Cs of the primary and secondary turbochargers 9 and 10, an inter-cooler 5, a throttle valve 6, a surge tank 7 and fuel injectors 8 disposed in discrete pipes 3c. Each of the individual elements mentioned is per se well known in the art.

The intake pipe 3 has first and second branch intake pipes 3a and 3b that separately branch off from the intake pipe 3 downstream of the air flow meter 4 and merge into the intake pipe 3 upstream of the inter-cooler 5. The rotary blowers Cp and Cs of the primary and secondary turbochargers 9 and 10 are disposed in the first and second branch intake pipes 3a and 3b, respectively.

Primary turbocharger 9 comprises a rotary turbine Tp disposed in the first exhaust pipe 2a, and is driven by exhaust gases from the engine 1 and the rotary blower Cp disposed in the first branch intake pipe 3a. The rotary blower Cp and rotary turbine Tp are connected to each other by a rotary shaft Lp. Similarly, the secondary turbocharger 10 comprises a rotary turbine Ts disposed in the second exhaust pipe 2b, and is driven by exhaust gases from the engine 1 and the rotary blower Cs disposed in the second branch intake pipe 3b. The rotary blower Cp and rotary turbine Tp are connected to each other by a rotary shaft Ls.

To allow pressure waves produced in any one of the first and second branch intake pipes 3a and 3b to easily be transmitted, or propagated, into the other of the first and second branch intake pipes 3a and 3b in one way, but not to be fluxed, or propagated, into the intake pipe 3 upstream of the first and second branch intake pipes 3a and 3b, the first and second branch intake pipes 3a and 3b upstream of the blowers Cp and Cs, respectively, are partly aligned in a straight line.

The second exhaust pipe 2b is provided with a shut-off valve 11, disposed upstream of the turbine Ts of the secondary turbocharger 10, which is operated by a diaphragm actuator 19 to shut off the second exhaust pipe 2b in order to prevent exhaust gases from the engine 1 from being forced to flow toward the turbine Ts of the secondary turbocharger 10, thereby allowing the primary turbocharger 9 only to work while a relatively small amount of intake air is delivered into the engine 1.

First and second exhaust pipes 2a and 2b, upstream of the respective turbines Tp and Ts, are interconnected to each other by way of a communication pipe 12. The communication pipe 12 is connected, at its mid portion, by way of a bypass pipe 18, provided with a waste gate valve 17, to a common exhaust pipe 2c opening to atmosphere. The second exhaust pipe 2b, downstream of the communication pipe 12, and the bypass pipe 18, upstream of the waste gate valve 17, are connected to each other by way of a communication pipe 14 provided with an exhaust gas relief valve 13. These valves 13 and 17 are, respectively, driven by diaphragm actuators 16 and 20, which have pressure chambers in communication with the first branch intake pipe 3a, downstream of the primary turbocharger 9, by way of a control pressure pipe 15.

The second branch intake pipe 3b is provided with an intake air shut-off valve 21. Intake air shut-off valve 21 is disposed therein downstream of the secondary turbocharger 10. The second branch intake pipe 3b is further provided with an intake air relief pipe 22 including a relief valve 23, so that intake air bypasses the secondary turbocharger from the upstream part of the second branch intake pipe 3b to the downstream part thereof. The intake air shut-off valve 21 and the intake air relief pipe 22 are driven independently of each other by diaphragm actuators 24 and 25 to shut off an intake air flow in the second branch intake pipe 3b and the intake air relief pipe 22, respectively.

The diaphragm actuators 19, 20, 24 and 25 for the valves 11, 17, 21 and 23, respectively, are, respectively, connected by way of control pressure pipes 28, 32, 26 and 30 to three-way solenoid valves 29, 33, 27 and 31. The three-way solenoid valve 27 has an inlet port connected to a pressure difference detecting valve 39 through a pipe 38, and an inlet port connected to a negative pressure chamber 43 through a pipe 36. The three-way solenoid valve 29 has an inlet port opening to atmosphere, and an inlet port connected to the negative pressure chamber 43 through the pipe 36. The three-way solenoid valve 31 has an inlet port opening to atmosphere, and an inlet port connected to the negative pressure chamber 43. Finally, the three-way solenoid valve 33 has an inlet port opening to atmosphere, and an inlet port connected to the communication pipe 15. The pressure difference detecting valve 39 has an outlet port 39a opening to atmosphere and inlet ports connected to the branch intake pipes 3a and 3b by way of pipes 41 and 42, respectively, so as to detect a difference between pressures P1 and P2 in the branch intake pipes 3a and 3b. The negative pressure chamber 43 is supplied, through a check valve 37, with negative pressure Pn created in the intake pipe 3 downstream of the inter-cooler 5. The three-way solenoid valves 27, 29, 31 and 33, respectively, are controlled by a control unit 35, which includes a general purpose microcomputer, so as to pneumatically operate the diaphragm actuators 24, 19, 25 and 20, respectively.

Control unit 35 receives various signals Sa, Sn, Ss, St and Spl, representative of the amount of intake air flowing through the intake pipe 3, the speed of rotation of the engine 1, or engine speed, the desired gear shift position of the automatic transmission 50, the opening, or operated position, of the throttle valve 6, and air pressure P1 in the intake pipe 3 downstream of the primary turbocharger 9, respectively, provided by the air flow meter 4, an engine speed sensor 61, a gear shift actuator 51, a throttle sensor 62 and a pressure sensor 63, respectively. The control unit 35 provides, in response to engine operating conditions represented by these input signals Sa, Sn, Ss, St and Spl, the three-way solenoid valves 27, 31, 29 and 33 with control signals E1, E2, E3 and E4, respectively, according to a programmed sequence, so as to actuate the three-way solenoid valves 27, 29, 31 and 33.

The pressure difference detecting valve 39 opens its pressure chamber to atmosphere through the outlet port 39a when the pressure difference between air pressures P1 and P2 in the branch intake pipes 3a and 3b is relatively large, and closes the output port 39a when the difference between the air pressures P1 and P2 in the branch intake pipes 3a and 3b is equal to or smaller than a predetermined pressure difference Pd. Accordingly, when the control pressure pipe 26 is communicated with the pipe 38 through the three-way solenoid valve 27, due to the presence of the control signal E1, and the pressure difference between the air pressures P1 and P2 is larger than the predetermined pressure difference Pd, the diaphragm actuator 24 is opened to atmosphere, so as to open the intake air shut-off valve 21. On the other hand, when the control pressure pipe 26 is communicated with the pipe 36 through the three-way solenoid valve 27, due to the presence of the control signal E1, negative pressure develops in the diaphragm actuator 24, so as to close the intake air shut-off valve 21.

Further, when the control pressure pipe 28 is communicated with the pipe 36 through the three-way solenoid valve 29, due to the presence of the control signal E3, negative pressure develops in the diaphragm actuator 19, so as to close the exhaust gas shutoff valve 11 and thereby allow only the primary turbocharger 9 to work. On the other hand, when the control pressure pipe 28 opens to atmosphere through the three-way solenoid valve 29, due to the presence of the control signal E3, the exhaust gas shut-off valve 11 is opened, so as to allow the secondary turbocharger 10 to work.

Figure 2:
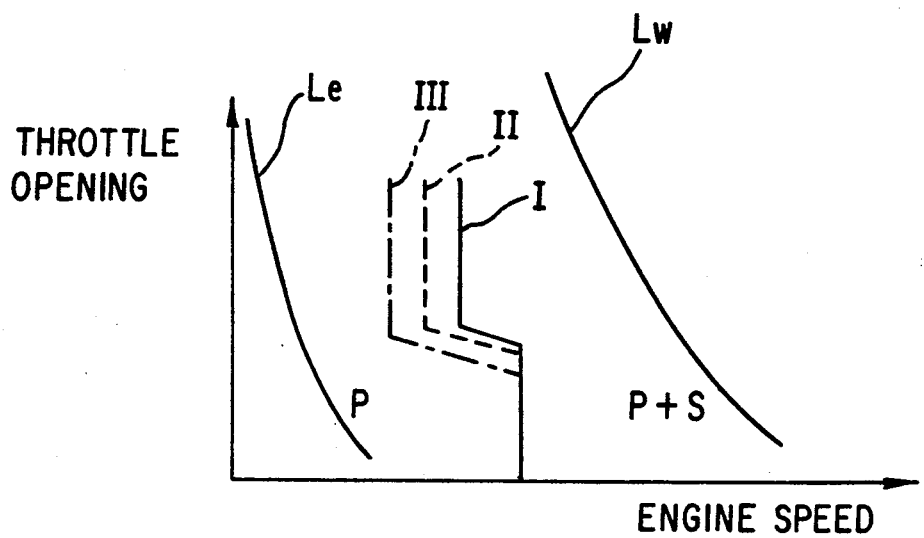
FIG. 2 is a diagram showing supercharger switching control lines.

Referring to FIG. 2, supercharger switching control patterns or lines are shown in terms of the correlation between engine speed and throttle opening. The control unit 35 operates the valves 11, 13, 17 21 and 23 according to these switching control patterns so as to selectively drive the primary and secondary superchargers 9 and 10. Data representative of the control lines shown in FIG. 2 is stored as a control map in the microcomputer of the control unit 5 in a well known manner. Supercharging is performed by the primary supercharger 9 throughout all engine operating ranges, including lower and higher engine speed ranges. Supercharging is performed by both of the primary and secondary superchargers 9 and 10 in only a higher engine operating speed range, which is defined as that range located on the high engine speed side of each switching control line I, II or III. The switching control lines I, II and III are selectively used according to engine operating conditions, such as engine speed and engine load, so as to provide a desired supercharging condition to the engine 1.

The waste gate valve 17 is closed on a lower engine speed side of a control line Lw, and is opened on a higher engine speed side of the control line Lw. The exhaust gas relief valve 13 is closed on a lower engine speed side of a control line Le, and is opened on a higher engine speed side of the control line Le. The intake air relief valve 23 is opened on a lower engine speed side of a control line III, and is closed on a higher engine speed side of the control line III. The exhaust gas shut-off valve 11 is closed on a lower engine speed side of a control line II, and is opened on a higher engine speed side of the control line II. Finally, the intake air shut-off valve 21 is opened on a lower engine speed side of a control line I, and is closed on a higher engine speed side of the control line I.

In a case in which the engine 1 operates at relatively low speeds, the negative pressure Pn is delivered, through the three-way solenoid valve 31 and the control pressure pipe 30, to the intake air relief valve 23, so that the intake air relief valve 23 keeps the intake air relief passage 22 open. Thereafter, upon receiving the control signal E2 from the control unit 35, the three-way solenoid valve 31 is actuated so as to open the control pressure pipe 30 to atmosphere and cause the intake air relief valve 23 to shut off the intake air relief passage 22 before the exhaust gas shut-off valve 11 and the intake air shut-off valve 21 are opened while the engine speed increases.

When a plot of the operating condition of engine 1 is in the area of the map shown in FIG. 2 having the control line III as an upper boundary, the control unit 35 keeps both the exhaust gas shut-off valves 11 and the intake air shut-off valve 21 closed and the intake air relief valve 23 open, so that only the primary turbocharger 9 is caused to operate and supercharge the engine 1. Then, when the operating condition of engine 1 changes so as to increase the supply rate of intake air and/or the engine speed so that the plot of the operating condition moves beyond the boundary of control line III and into the operating condition area between the control lines III and II, the control unit 35 closes the intake air relief valve 23. During this process, before the intake air relief valve 23 closes, the exhaust gas relief valve 13 is opened when the amount of intake air increases so as to cause the plot of the engine operating condition to cross the line Le. A slight amount of exhaust gas is thereby delivered into the turbine Ts of the secondary turbocharger 10 as long as the intake air relief valve 23 is open. This results in the turbine Ts being driven by the exhaust gas flowing through the exhaust gas relief passage 14, so that the secondary turbocharger 10 is subjected to a preliminary rotation before the exhaust gas shut-off valve 11 opens.

Thereafter, when a further increase in intake air and/or engine speed is caused, so that the plot of the engine operating condition crosses the control line II and moves into the area of operating conditions between the lines II and I, the control unit 35 opens the exhaust gas shut-off valve 11. Then, when a still further increase in intake air and/or engine speed is caused, so that the plot of the engine operating condition crosses the control line I and moves into the area of operating conditions beyond the control line I so that control line I is a lower boundary, the control unit 35 opens the intake air shut-off valve 21. Therefore, both the turbine Tp of the primary turbocharger 9 and the turbine Ts of the secondary turbocharger 10 are driven by the exhaust gas passing through the first and second separated exhaust pipes 2a and 2b, respectively. Thus, both the primary and secondary turbochargers 9 and 10 work to supercharge the engine 1.

Although, in this embodiment, three switching control lines I, II and III have been established, the number of switching control lines may be increased or decreased according to engine control demands.

Figure 3:
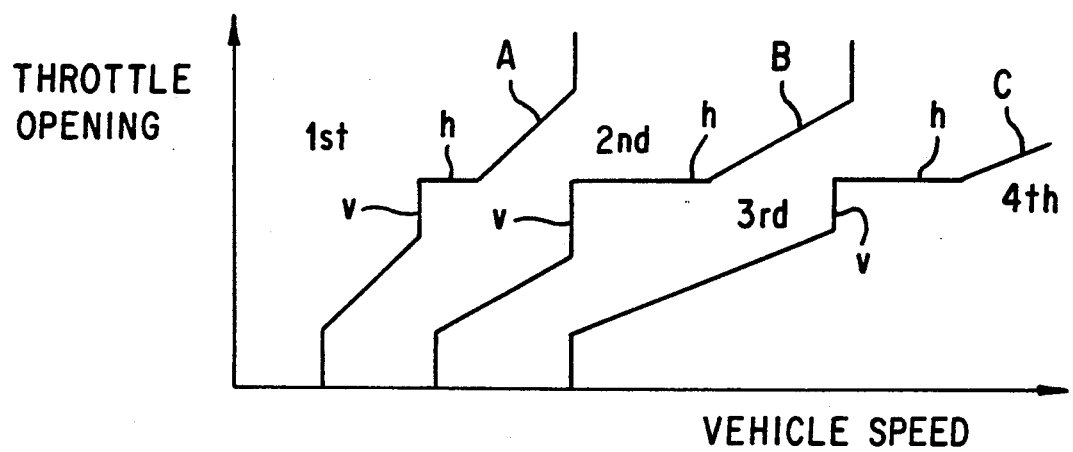
FIG. 3 is a diagram showing transmission gear shifting control lines.

Referring to FIG. 3, transmission gear shifting control patterns or lines are shown in terms of a correlation between vehicle speed and throttle opening, by which the control unit 35 causes the automatic transmission 50 to shift to any desired gear. Data representative of the control lines shown in FIG. 3 is also stored as a control map in the microcomputer of the control unit 35 in a well known manner. The gear in which automatic transmission 50 is operating shifts from first to second gear when a current running condition of the vehicle crosses the shift control line A, from second to third when the current running condition crosses the shift control line B, and from third to fourth when the current running condition crosses the shift control line C.

Each shift control line A, B or C has a buffer zone defined by a horizontal line segment h and a vertical line segment v. The horizontal line segment represents an invariable throttle opening, regardless of changes in vehicle speed, and the vertical line segment v, immediately preceding the horizontal line segment h, represents an invariable vehicle speed, regardless of changes in throttle opening. The horizontal line segment h of each shift control line is defined in a range of vehicle speeds such that the shift control line is intersected by the corresponding supercharger switching control line when the lines are superimposed.

Figure 4:
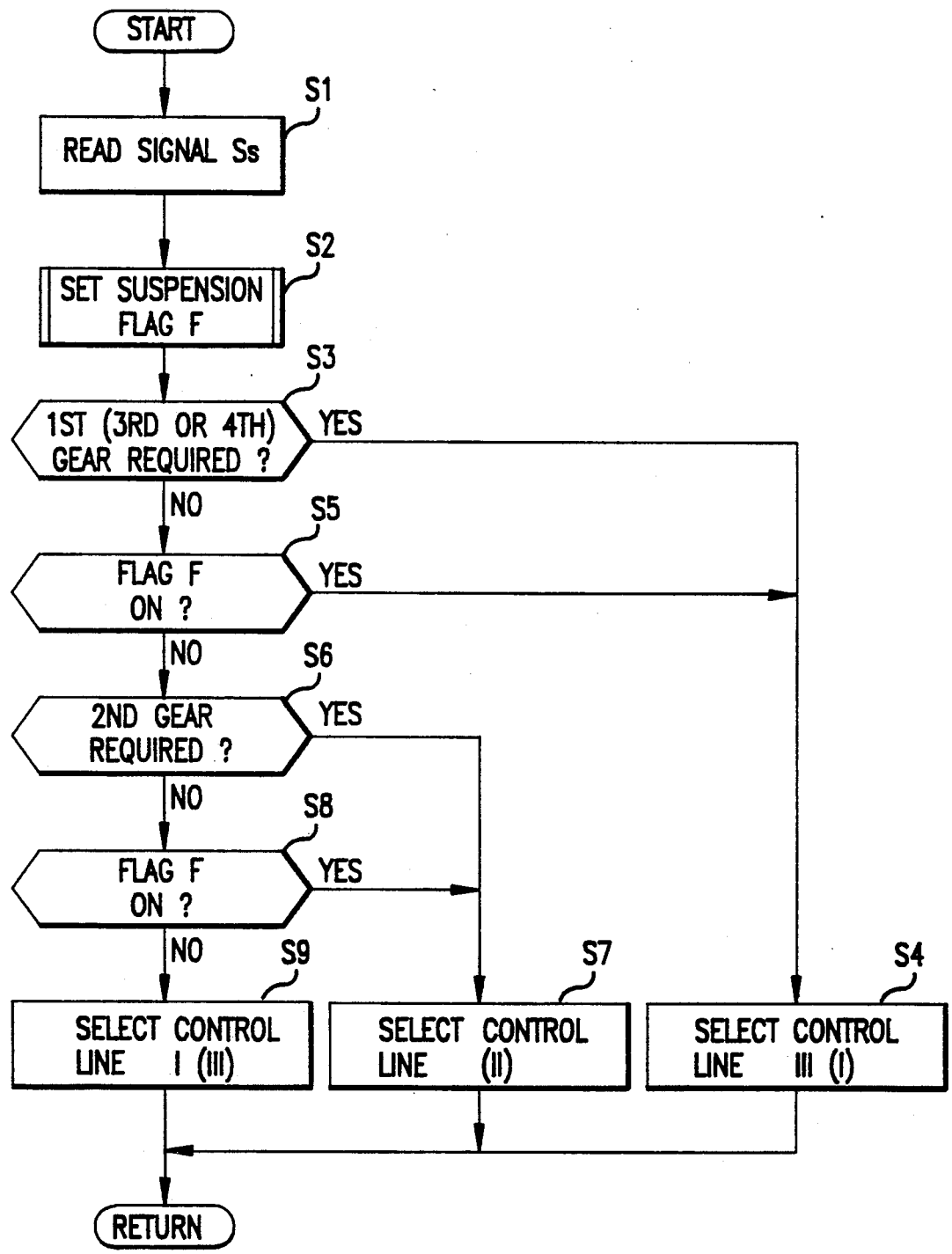
FIG. 4 is a flow chart illustrating the sequential operation of the control device for managing supercharger switching control.
Figure 5:
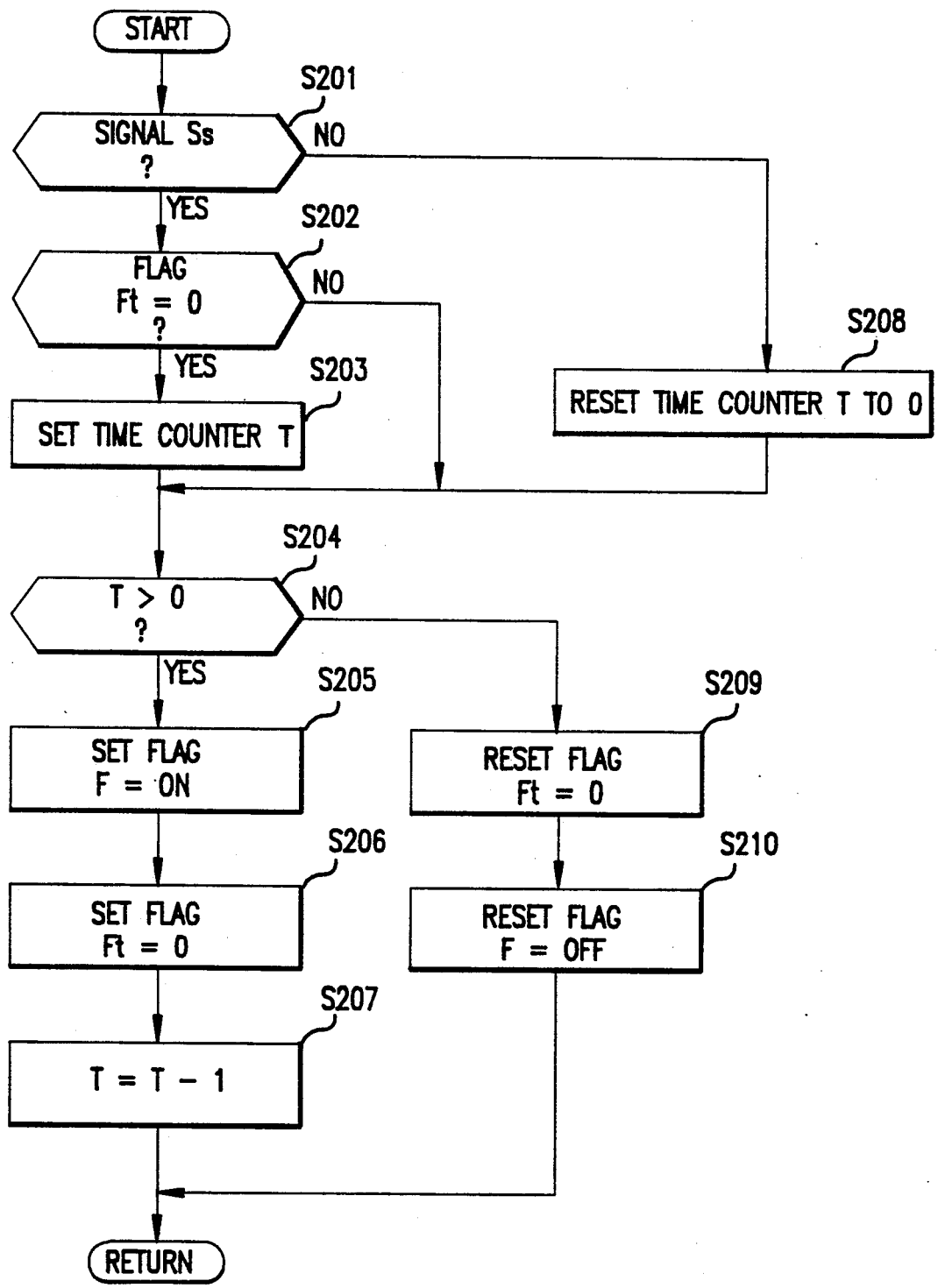
FIG. 5 is a flow chart illustrating a delay flag setting subroutine.

The selection, or change, of the switching control lines I, II and III depicted in FIG. 2 is best understood by reviewing FIGS. 4 and 5, which are flow charts illustrating a main routine and a subroutine for a microcomputer of the controller 35. Programming a computer is a skill well understood in the art. The following description is written to enable a programmer having ordinary skill in the art to prepare an appropriate program for the microcomputer of the controller 35. The particular details of any such program would, of course, depend upon the architecture of the particular computer selected.

Referring to FIG. 4, which is a flow chart illustrating the supercharger switching control line selection main routine, the selection of the supercharger switching control line I, II or III is made after a predetermined suspension time of any shifting operation, be it upshifting or downshifting, of the automatic transmission 50. It is to be noted that the supercharger switching control line selection main routine is periodically repeated. The first step S1 in the supercharger switching control line selection main routine is to read a gear position control signal Ss to be sent to the gear shift actuator 51, and, thereby, to recognize, based on the gear position control signal Ss, the gear position into which the automatic transmission 50 is required to shift according to engine demand. After the recognition of the gear position at step S1, the suspension or delay flag setting subroutine shown in FIG. 5 is executed at step S2.

In the suspension or delay flag setting subroutine, suspension or delay flag F is set to an active state, or to ON, or reset to a non-active state, or to OFF. The suspension flag F, if it has been set to ON, suspends any selection of a supercharger switching control line for a predetermined period of time. That is, the suspension flag F is set to ON at the moment a gear shift control signal is presented and reset to OFF the predetermined period of time after it has been set to ON.

The first step in the suspension flag setting subroutine is to decide whether a shift control signal Ss is present at step S201. If the answer to the decision at step S201 is yes, this indicates that there has been provided a shift control signal Ss for upshifting or downshifting. Then, a time counter T is set to a predetermined time Tt at step S203, but only when the answer to a decision at step S202 as to whether the timer flag Ft has been reset to an inactive state of zero (0) is yes. Thereafter, at step S204, a final decision is made as to whether the time counter T has counted up the predetermined time Tt. If the predetermined time has not been counted up, i.e., the answer to the decision made in step S204 is yes, then, after sequentially setting the suspension flag F to ON at step S205 and the timer flag Ft to an active state of one (1) at step S206, the timer counter T changes its count by a decrement of one (1) at step S207. The final step then orders a return to the main routine.

If the answer to the decision at step S201 is no, this indicates that a shift control signal Ss has not been provided or has disappeared, and the automatic transmission 50 is required to stay in its present gear. Then, the time counter T is reset to zero (0) at step S208. In this event, the answer to the decision at step S204 will be no. After sequentially setting the timer flag Ft to the inactive state of zero (0) at step S209 and the suspension flag F to OFF at step S210, the final step orders a return to the main routine. If a shift control signal Sn is provided during a previous execution of the supercharger switching control line selection main routine and the time counter T is counting down, the timer flag Ft will, accordingly, have been set to the active state of one (1) at step S206. If the answer to the decision at step S202 is no, the decision at step S204 is made without setting the timer counter T at step S203.

Referring back to the main routine illustrated in FIG. 4, the first decision in the main routine is at step S3. In step S3, it is determined whether the recognized gear is first when the automatic transmission 50 is required to shift down, or second or third when the automatic transmission 50 is required to shift up. If the answer to the decision at step S3 is yes, this indicates that the recognized gear is either first when downshifting, or second or third when upshifting. Then, the control unit 35 selects either the switching control line III when downshifting or the switching control line I when upshifting, and retrieves the data representative of the switching control line III or I at step S4. Further, when the answer to the decision at step S3 is no, indicating that the recognized gear is neither first when downshifting, nor second or third when upshifting, and the suspension flag F has been set ON as a result of a decision at step S5, the control unit 35 selects either the switching control line I when downshifting or the switching control line III when upshifting, and also retrieves the data representative of the selected switching control line III or I at step S4.

If the suspension flag F is judged not to have been set to ON at step S5, a decision is made at step S6 as to whether the recognized gear is second whenever the automatic transmission 50 is required to shift up and to shift down. If the answer to the decision at step S6 is yes, this indicates that the recognized gear is second. Then, the control unit 35 selects the switching control line II in cases of both upshifting and downshifting, and retrieves the data representative of the selected switching control line II at step S7. Further, when the answer to the decision at step S6 is no, indicating that the recognized gear is not second, and the suspension flag F has been set ON, as a result of a decision at step S8, the control unit 35 selects the switching control line II, and also retrieves the data representative of the selected switching control line II at step S7.

If, as a result of the decisions at steps S6 and S8, it is judged that the recognized gear is not second and the suspension flag F has not been set to ON, then, the control unit 35 selects either the switching control line III when upshifting or the switching control line I when downshifting, and retrieves the data representative of the selected switching control line III or I at step S9.

The control system in accordance with a preferred embodiment of the present invention maintains the suspension flag F so that it is set ON for the predetermined period of time defined by the predetermined time Tt after the appearance of a shift control signal Ss is provided for, for instance, upshifting from first gear to second. Therefore, the selection of switching control line II is not performed immediately after the appearance of the shift control signal Ss for upshifting from first gear to second gear, and is suspended for the predetermined period of time. That is, the previously selected switching control line I is kept effective for the predetermined period of time after the appearance of shift control signal. During the predetermined period of time, the selection of one of the switching control lines is suspended even though the operating condition of the engine changes so that it crosses one of the switching control lines, so as to suspend the switching of the primary and secondary superchargers.

Since, during the predetermined period of time, the automatic transmission has completed its gear shift and the engine has become stable in operation, a simultaneous occurrence of the changing of the capacity of the supercharger means and the shifting of the automatic transmission is eliminated. Torque shock accompanying simultaneous changing of the capacity of the supercharger means and shifting of the automatic transmission is greatly reduced.

It is to be understood that although the present invention has been described in detail with respect to a preferred embodiment thereof, various other embodiments and variants are possible which fall within the scope and spirit of the invention, and such embodiments and variants are intended to be covered by the following claims.

What is claimed is:

1. A control system for supercharged internal combustion engine equipped with an automatic transmission, comprising:
    transmission shift control means for causing the automatic transmission to be shifted to a desired speed gear according to a gear shift control pattern;
    supercharging means, capable of changing its supercharging capacity, for supercharging the internal combustion engine; and
    supercharging control means for changing said supercharging capacity of said supercharging means according to a supercharging capacity control pattern;
    said transmission shift control means switching the supercharging capacity control pattern according to said desired speed gear and causing a delay of any change in said supercharging capacity, according to said supercharging capacity control pattern, by said supercharging control means when said transmission shift control means demands a shift of the automatic transmission to a desired speed gear.

2. A control system as defined in claim 1, wherein said transmission shift control means causes a predetermined period of delay of any change in said supercharging capacity, according to said supercharging capacity control pattern, by said supercharging control means when said transmission shift control means demands a shift of the automatic transmission to a desired speed gear.

3. A control system as defined in claim 2, wherein said supercharging control means changes said supercharging capacity so as to increase said supercharging capacity at higher engine speeds when a demand to shift the automatic transmission to a lower speed gear is present than when a demand to shift the automatic transmission to a higher speed gear is present.

4. A control system as defined in claim 3, wherein said supercharging capacity control pattern comprises a plurality of supercharging capacity control lines selectively used according to speed gears of the automatic transmission.

5. A control system as defined in claim 4, wherein each of said supercharging capacity control lines is defined by engine speed and throttle opening.

6. A control system as defined in claim 5, wherein said supercharging control means changes said supercharging capacity of said supercharging means stepwise with said control line.

7. A control system as defined in claim 6, wherein said supercharging means comprises two superchargers, one of said two superchargers being selectively used to change said supercharging capacity of said supercharging means stepwise.

8. A control system as defined in claim 7, wherein each said supercharger comprises a turbocharger.

* * * * *